United States Patent [19]

Marin

[11] 4,038,371
[45] July 26, 1977

[54] DISMUTATION OF TRICHLOROSILANE

[75] Inventor: Gilbert Marin, Sainte-Foy-les-Lyon, France

[73] Assignee: Rhone-Poulenc Industries, Paris, France

[21] Appl. No.: 628,666

[22] Filed: Nov. 4, 1975

[30] Foreign Application Priority Data

Nov. 7, 1974 France .................................. 74.36961

[51] Int. Cl.$^2$ ............................................. C01B 33/08
[52] U.S. Cl. ........................................ 423/342; 252/426
[58] Field of Search .......................... 423/342; 252/426

[56] References Cited

U.S. PATENT DOCUMENTS

| 3,044,845 | 7/1962 | Jex et al. ................................ 423/342 |
| 3,445,200 | 5/1969 | Dumagues et al. .............. 423/342 X |
| 3,535,092 | 10/1970 | Chalk .................................... 423/342 |

Primary Examiner—Jack Cooper
Attorney, Agent, or Firm—Stevens, Davis, Miller & Mosher

[57] ABSTRACT

Trichlorosilane is dismutated to dichlorosilane in the presence, as catalyst, of a tetraalkylurea.

4 Claims, No Drawings

DISMUTATION OF TRICHLOROSILANE

The present invention relates to a process for the dismutation of trichlorosilane.

It is known that by dismutation of trichlorosilane dichlorosilane is obtained, and it is also known that dischlorosilane is used for the preparation of a deposit of silicon of very high purity in the electronics industry (silicon epitaxy). With this purpose in mind, the dismutation reaction has already been carried out in the presence of various catalysts. Amongst the various catalysts, the use of nitriles has been proposed (see U.S. Pat. No. 2,732,282). The disadvantage of this process resides in the need to carry out the dismutation reaction at a temperature of the order of 150° and above. Th aliphatic cyanamides can also be used as dismutation catalysts (see U.S. Pat. No. 2,732,280) but in order to activate these catalysts it is necessary to subject them to a supplementary treatment with a Lewis acid (see U.S. Pat. No. 2,732,281). It follows that the resulting dichlorosilane contains impurities such as boron, aluminium and titanium, and is therefore unsuitable for epitaxy.

It has been proposed to use amines and amine hydrochlorides as catalysts (see, for example U.S. Pat. No. 2,834,648 and French Pat. No. 2,096,605) but these catalysts give low yields. The use of hexamethylphosphotriamide as catalyst (see French Pat. No. 1,444,735) does make it possible to obtain dichlorosilane in good yields but this compound cannot be used for silicon epitaxy because of the presence of impurities containing phosphorus. Finally, it has been proposed to use dimethylformamide or dimethylacetamide as catalysts, but the yields of dichlorosilane are low as a result of degradation of the catalysts.

It has now been found, according to the present invention, a process for the dismutation of trichlorosilane to dichlorosilane characterised in that a N,N,N',N'-tetraalkylurea is used as the catalyst.

The use of a tetraalkylurea as a catalyst makes it possible to obtain, by dismutation at temperatures as low as 50° C, excellent yields of a dichlorosilane which is very suitable for silicon epitaxy and which, in particular, generally has boron, phosphorus and arsenic contents less than 0.001 ppm. Furthermore, the catalyst can be recycled, which is an undoubted advantage of the process.

Suitable tetraalkylureas which can be used correspond to the general formula;

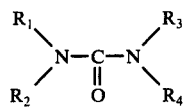

in which each of $R_1$, $R_2$, $R_3$ and $R_4$, which may be identical or differenc, represents a straight or branched alkyl group having 1 to 6 carbon atoms. Specific examples include tetramethylurea, tetraethylurea and tetrabutylurea. Preferably, tetramethylurea is employed, the use of which as a solvent is currently expanding in industry.

The tetraalkylureas can easily be obtained in accordance with the methods described in Rodd's Chemistry of Carbon Compounds, second edition - Aliphatic Compounds - part C, pages 311-312 (1965). The action of phosgene on secondary amines may be mentioned as an example.

The amount of catalyst employed is not critical but it is generally from 1 to 50%, preferably from 5 to 30% by weight based on the weight of the trichlorosilane employed.

The process according to the invention can be carried out continuously or discontinuously suitably by heating the reactants under reflux at atmospheric pressure with an initial temperature of the order of 30 to 40° C, and removing the dichlorosilane formed, by distillation, at the rate at which it is formed. It is also possible to add a diluent to the reactants, such as an aliphatic or aromatic hydrocarbon, in particular cyclohexane or benzene. It is also possible, in order to increase the rate of the dismutation reaction, to carry out the process under a pressure above atmospheric pressure, for example under a pressure which can be as high as 3 bars absolute. The temperature of the dismutation reaction is generally from 30 to 12:° C.

When the dismutation reaction is complete it is found that, in general, there remains a little residual trichlorosilane in the reaction mixture, and the presence of silicon tetrachloride generated by the reaction is observed. The trichlorosilane can be recovered by distillation an again be subjectd to dismutation to form dichlorosilane.

The following Examples further illustrate the present invention; all temperatures are in degrees Centigrade.

EXAMPLE 1

573 g of trichlorosilane and 57 g of tetramethylurea are introduced into a flask kept under a nitrogen atmosphere, the mixture is heated to a reflux temperature (33°) and the dichlorosilane is distilled under atmospheric pressure at the rate at which it is formed. In 8 hours, during which the temperature of the reaction mixture rises from 35 to 48° and the boiling point of the distillate remains close to 11°, a fraction of 130 g, containing essentially dichlorosilane and a little trichlorosilane, is collected. A fraction of 110 g (boiling point: 8.5°–9°) corresponding to pure dichlorosilane is isolated by rectifying the distillate. Chromatographic analysis is used to show that 228 g of unreacted trichlorosilane and 189 g of tetrachlorosilane remain.

This dichlorosiliane is very suitable for epitaxy. It has boron, phosphorus, arsenic and aluminum contents less than 0.001 ppm (determined by colorimetry, atomic absorption and emission spectrography.

EXAMPLE 2

630 g of trichlorosilane and 126 g of tetramethylurea are introduced into a flask kept under a nitrogen atmosphere, the mixture is heated to the reflux temperature and a fraction of 172 g is distilled in 7 hours 30 minutes. During the reaction, the temperature of the reaction mixture rises from 38 to 60° whilst the boiling point of the distillate is 11. Rectification of the distillate gives a fraction of 143 g (boiling point: 8.5°–9°), corresponding to pure dichlorosilane.

195 g of cyclohexane are added to the reaction mixture so as to separate the residual trichlorosilane (149 g) and the silicon tetrachloride (280 g) by distillation. On continuing the distillation, a fraction of 105 g (boiling point$_{11}$: 63) corresponding to recovered tetramethylurea is obtained after removal of the cyclohexane.

I claim:

1. In a process for the preparation of dichlorosilane and tetrachlorosilane by the disproportionation of trichlorosilane in the presence of a catalyst, the improvement wherein a N,N,N',N'-tetraalkylurea of the formula:

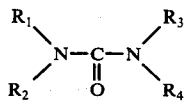

in which each of $R_1$, $R_2$, $R_3$ nd $R_4$, which may be identical or different, represents a straight or branched alkyl group having from 1 to 6 carbon atoms is used as the catalyst in an amount from 1 to 50% by weight based on the weight of trichlorosilane, the disproportionation being carried out at a temperature from 30° to 120° C. at a pressure up to 3 bars absolute.

2. Process according to claim 1 in which the tetraalkylurea is tetramethylurea.

3. Process according to claim 1, in which the dichlorosilane is isolated from the reaction mixture by distillation at the rate at which it is formed.

4. Process according to claim 1 in which the catalyst is used in an amount from 5 to 30% by weight based on the weight of trichlorosilane.

* * * * *